United States Patent
Ichikawa et al.

(10) Patent No.: US 10,652,430 B2
(45) Date of Patent: May 12, 2020

(54) IMAGE PROCESSING APPARATUS, IMAGE PROCESSING METHOD, AND STORAGE MEDIUM TO CONVERT IMAGE DATA

(71) Applicant: CANON KABUSHIKI KAISHA, Tokyo (JP)

(72) Inventors: Masanori Ichikawa, Tokyo (JP); Shigeki Hasui, Tokyo (JP); Yosuke Obayashi, Nagareyama (JP); Yoshihisa Nomura, Kashiwa (JP); Hiroaki Niitsuma, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/271,536

(22) Filed: Feb. 8, 2019

(65) Prior Publication Data
US 2019/0268500 A1 Aug. 29, 2019

(30) Foreign Application Priority Data
Feb. 28, 2018 (JP) ................................. 2018-035593

(51) Int. Cl.
*H04N 1/40* (2006.01)
*H04N 1/46* (2006.01)

(52) U.S. Cl.
CPC ..... *H04N 1/465* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 9,602,685 | B2 * | 3/2017 | Miyauchi | G06K 9/6256 |
| 2004/0013320 | A1 * | 1/2004 | Atkins | G06T 3/4007 |
| | | | | 382/300 |
| 2005/0281455 | A1 * | 12/2005 | Huang | G06K 9/00456 |
| | | | | 382/156 |
| 2009/0073516 | A1 * | 3/2009 | Tanaka | H04N 1/46 |
| | | | | 358/505 |
| 2011/0069331 | A1 * | 3/2011 | Honma | H04N 1/465 |
| | | | | 358/1.9 |
| 2011/0199623 | A1 * | 8/2011 | Okuyama | H04N 1/00408 |
| | | | | 358/1.9 |
| 2016/0247049 | A1 * | 8/2016 | Li | H04N 1/40012 |
| 2019/0268580 | A1 * | 8/2019 | Niitsuma | G06K 9/66 |

FOREIGN PATENT DOCUMENTS

JP 2011-66734 A 3/2011

* cited by examiner

*Primary Examiner* — Dung D Tran
(74) *Attorney, Agent, or Firm* — Canon USA, INC., IP Division (57) ABSTRACT

An image processing method includes determining whether image data acquired by reading a document with a reading unit is color or monochrome, saving color image data determined to be color and monochrome image data generated by monochrome conversion of the color image data, in association with each other as a learning sample, deciding a color conversion parameter to be used when image data read by the reading unit and determined to be monochrome image data is converted into a color image, using the saved learning sample, and converting the image data read by the reading unit and determined to be the monochrome image data into color image data, using the decided color conversion parameter.

13 Claims, 12 Drawing Sheets

| No. | LEARNING SAMPLE INPUT IMAGE | LEARNING SAMPLE EXPECTED IMAGE |
|---|---|---|
| 1 | /work/input/input_001.jpg | /work/expect/exp_001.jpg |
| 2 | /work/input/input_002.jpg | /work/expect/exp_002.jpg |
| 3 | /work/input/input_003.jpg | /work/expect/exp_003.jpg |
| ⋮ | ⋮ | ⋮ |

FIG.7

FIG.8B
OPERATION UNIT SCREEN 2

FIG.8D
OPERATION UNIT SCREEN 4

FIG.8C
OPERATION UNIT SCREEN 3

FIG.9

FIG.10A
LEARNING TABLE EXAMPLE 1

| No. | LEARNING SAMPLE INPUT IMAGE | LEARNING SAMPLE EXPECTED IMAGE | LEARNING STATUS |
|---|---|---|---|
| 1 | /work/input/input_001.jpg | /work/expect/exp_001.jpg | UNUSED |
| 2 | /work/input/input_002.jpg | /work/expect/exp_002.jpg | UNUSED |
| 3 | /work/input/input_003.jpg | /work/expect/exp_003.jpg | UNUSED |
| ⋮ | ⋮ | ⋮ | ⋮ |

FIG.10B
LEARNING TABLE EXAMPLE 2

| No. | LEARNING SAMPLE INPUT IMAGE | LEARNING SAMPLE EXPECTED IMAGE | LEARNING STATUS |
|---|---|---|---|
| 1 | /work/input/input_001.jpg | /work/expect/exp_001.jpg | USED |
| 2 | /work/input/input_002.jpg | /work/expect/exp_002.jpg | USED |
| 3 | /work/input/input_003.jpg | /work/expect/exp_003.jpg | UNUSED |
| ⋮ | ⋮ | ⋮ | ⋮ |

IMAGE PROCESSING APPARATUS, IMAGE PROCESSING METHOD, AND STORAGE MEDIUM TO CONVERT IMAGE DATA

BACKGROUND

Field of the Disclosure

The present disclosure generally relates to image processing and, more particularly, to an image processing apparatus, an image processing method, a storage medium, and to a technology concerning processing for converting a monochrome image into a color image in an image processing apparatus.

Description of the Related Art

There is a multifunction printer (hereinafter referred to as "MFP") of a type that executes image processing for converting a monochrome image read by a scanner into a color image (hereinafter referred to as "colorization processing"). Conventionally, a value used as a setting value for image processing in the colorization processing for a monochrome image is a value determined beforehand for each product when the product is shipped, or a value changed when firmware is updated.

There is a discussion about a configuration for holding a plurality of setting values and meeting a criterion so that visibility of an image after the colorization processing is enhanced (Japanese Patent Application Laid-Open No. 2011-66734). Meanwhile, the setting value for the image processing in the colorization processing for the monochrome image is decided based on an evaluation that uses assumed general data.

The number of combinations of hues that are used when the colorization processing is performed for the monochrome image is extremely large. In addition, the setting value for the image processing in the colorization processing is not a value appropriately set for each user. Therefore, the colorization processing for the monochrome image does not necessarily result in a color image expected by a user.

Meanwhile, there are some known technologies for recognizing text or an object, by causing a machine to learn using collected learning samples and thereby creating a learning model. In general, these technologies are called machine learning. In particular, a scheme called deep learning is used for object recognition. The deep learning is configured of a multilayered neural network, and causes a machine to learn based on input of a learning sample including input data and expected data. There can be a difference between output data corresponding to the input data supplied to the multilayered neural network and the expected data, and this difference is evaluated using an error function. Based on this evaluation, a parameter of the multilayered neural network receives feedback through backpropagation. A parameter that minimizes the difference between the output data and the expected data can be obtained by repeating learning of a large number of learning samples (hereinafter referred to as "learning data"). Such parameter optimization will be hereinafter referred to as "learning". In this way, the data output from the multilayered neural network approaches the expected data. In particular, in a case where image data is used as the input data, it is common to use a multilayered convolution neural network (hereinafter referred to as "CNN") as the multilayered neural network.

It is conceivable that, if such a machine learning technology is applied to the colorization processing for the monochrome image, an output with hues in line with collected learning samples may be obtained. However, there is no method for collecting learning samples using an ordinary MFP. Besides, a learning sample cannot have the setting value appropriately set for each user unless learning models collected for each user are created.

There is conventionally no method for automatically collecting learning samples for color conversion to perform color conversion of monochrome image data input into an image processing apparatus.

SUMMARY OF THE DISCLOSURE

According to one or more aspects of the present disclosure, and to provide further enhancements to image processing technology, an image processing apparatus includes a determination unit configured to determine whether image data acquired by reading a document with a reading unit is color or monochrome, a saving unit configured to save color image data determined to be color by the determination unit and monochrome image data generated by monochrome conversion of the color image data, in association with each other as a learning sample, a decision unit configured to decide a color conversion parameter to be used when image data read by the reading unit and determined to be monochrome image data by the determination unit is converted into a color image, using the learning sample saved in the saving unit, and a color conversion unit configured to convert the image data read by the reading unit and determined to be the monochrome image data by the determination unit into color image data, using the color conversion parameter decided by the decision unit.

Further features of the present disclosure will become apparent from the following description of exemplary embodiments with reference to the attached drawings.

DESCRIPTION OF THE EMBODIMENTS

Various exemplary embodiments, aspects, and features of the present disclosure will be described below with reference to the drawings.

A multi-function peripheral (MFP) that is an image processing apparatus according to a first exemplary embodiment of the present disclosure will be described. If a function described in the present exemplary embodiment can be executed, the function may be executed by the MFP alone or may be executed by a system including the MFP and a plurality of other apparatuses, unless otherwise specified.

In the present exemplary embodiment, processing that involves operation for scanning a document, such as copying or transmission of a document, is executed based on a user instruction. In parallel with the processing executed based on the user's instruction, monochrome conversion is performed for color image data obtained by scanning the document, so that monochrome image data is acquired. Further, the combination of the color image data and the acquired monochrome image data is saved. Using information obtained from the saved image data, a color conversion parameter to be used for colorization processing is decided (updated). Therefore, learning data can be collected using a document actually used by the user or image data obtained by scanning this document, and the color conversion parameter to be used for the colorization processing can be updated using this learning data. Hence, the color conversion parameter can be decided (updated) based on a color arrangement of a document frequently used in a user environment. Accordingly, the colorization processing that tends to be desirable for the user can be performed.

Figure 1:
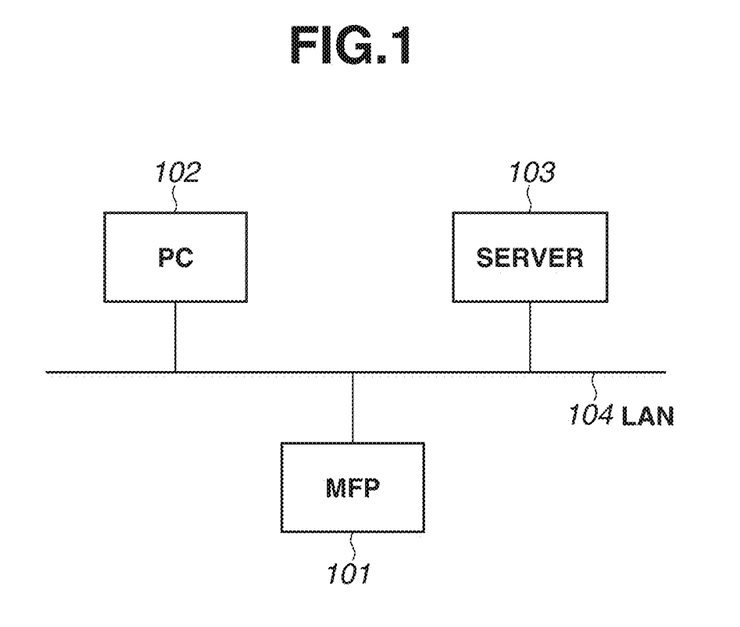
FIG. 1 is a block diagram illustrating a system according to a first exemplary embodiment.

FIG. 1 is a diagram illustrating a system configuration. In FIG. 1, a MFP 101 can communicate with other apparatuses on a local area network (LAN) 104. A personal computer (PC) 102 can communicate with the MFP 101 via the LAN 104. The PC 102 is connected to the LAN 104 by a physical cable. A server 103 can communicate with the MFP 101 and the PC 102 via the LAN 104. The server 103 is connected to the LAN 104 by a physical cable.

The LAN 104 interconnects the MFP 101, the PC 102, and the server 103 to enable communication therebetween. It is common to use Ethernet for a physical layer and a link layer.

The apparatuses in FIG. 1 are each illustrated as a single apparatus, but are not limited to this example. Each apparatus may be provided to be plural in a system.

Figure 2:
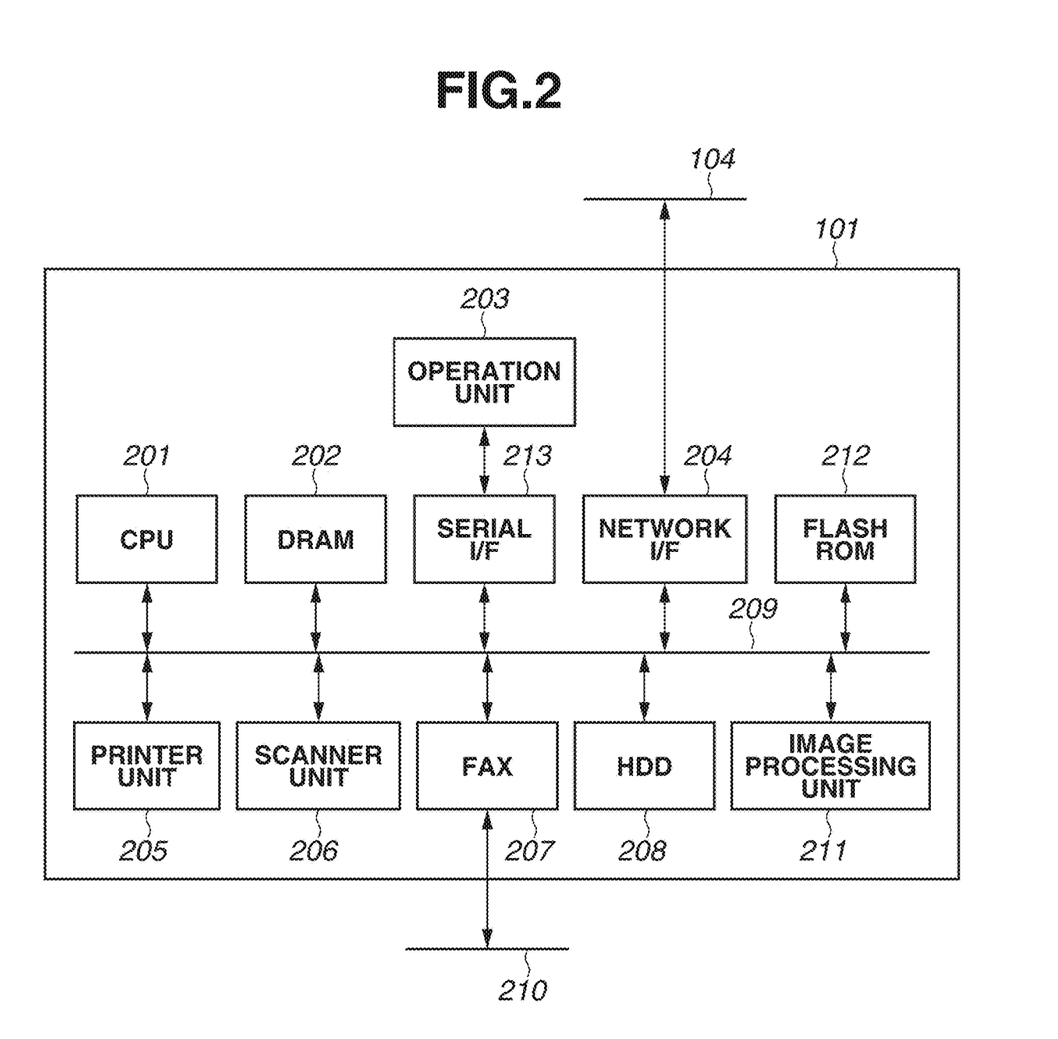
FIG. 2 is a block diagram illustrating a multi-function peripheral (MFP) according to the first exemplary embodiment.

FIG. 2 is a diagram illustrating a configuration of the MFP 101. A central processing unit (CPU) 201, which may include one or more processors, one or more memories, circuitry, or a combination thereof, may control processing to be executed in the MFP 101. A dynamic random access memory (DRAM) 202 stores a program to be executed by the CPU 201 and functions as a work area for temporary data. An operation unit 203 notifies an operation performed by a user to the CPU 201 via a serial interface (I/F) 213. A network I/F 204 connects to the LAN 104 to communicate with an external apparatus. A printer unit 205 prints an image using image data on a recording medium such as a sheet. A scanner unit 206 serving as a reading unit optically reads an image formed on a sheet and generates a scanned image by converting the read image into an electrical signal. A facsimile (FAX) 207 connects to a public line 210 to perform facsimile communication with an external apparatus. A hard disk drive (HDD) 208 is a storage unit that stores a program to be executed by the CPU 201, and is used as a spool area for jobs such as a print job and a scan job. A system bus 209 interconnects each module to perform communication. The public line 210 interconnects the FAX 207 and an external apparatus. An image processing unit 211 executes processing for converting a print job received by the network I/F 204 into an image suitable for printing by the printer unit 205, and processing for a scanned image obtained by the scanner unit 206. Further, the image processing unit 211 converts image data (a page-description language (PDL) code) received from an external apparatus via the LAN 104 and the network I/F 204 into bitmap data. Furthermore, the image processing unit 211 performs image processing as preprocessing for printing the image data by the printer unit 205. Details of the processing by the image processing unit 211 will be described below. A flash read only memory (ROM) 212 stores a program to be executed by the CPU 201. The flash ROM 212 also stores values such as a default setting value for the MFP 101, a default setting value for each user, and a temporary custom setting value (hereinafter referred to as "default setting value"). The serial I/F 213 interconnects the operation unit 203 and the system bus 209.

Figure 3:
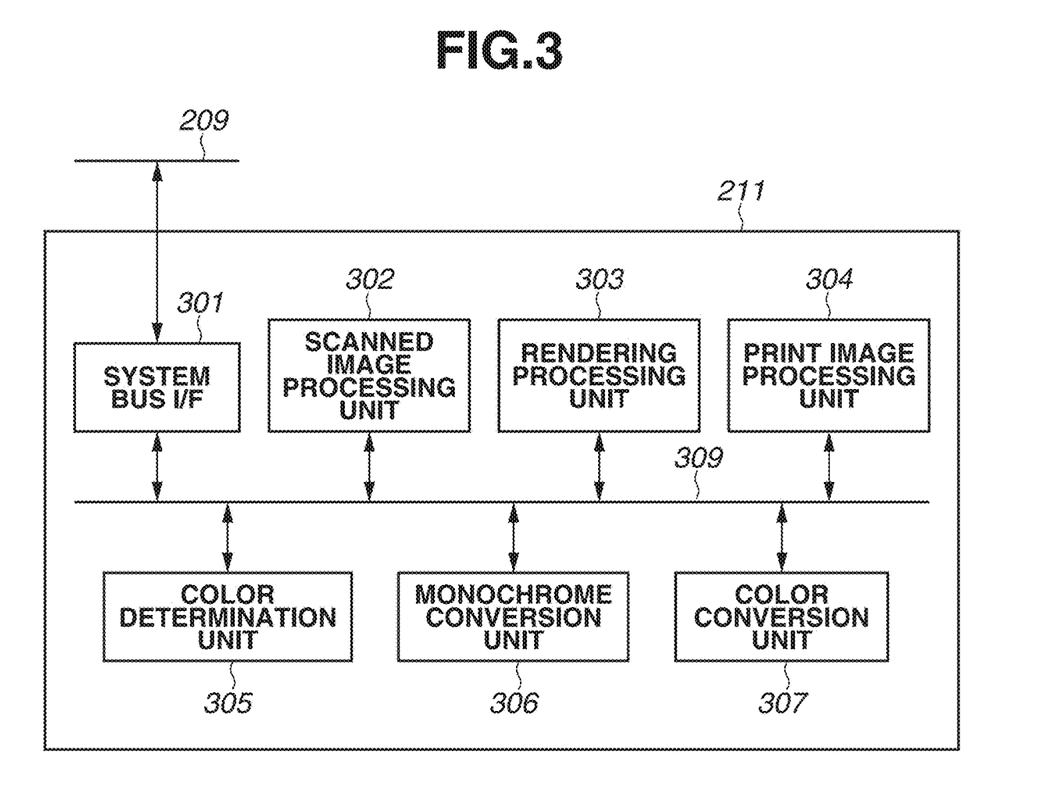
FIG. 3 is a block diagram illustrating an image processing unit of the MFP according to the first exemplary embodiment.

FIG. 3 is a diagram illustrating an internal configuration of the image processing unit 211.

In FIG. 3, a system bus I/F 301 can interconnect each module of the image processing unit 211 and each module connected to the system bus 209, by performing protocol conversion and arbitration between the system bus 209 and a signal bus 309.

A scanned image processing unit 302 includes an image processor that performs shading correction processing and modulation transfer function (MTF) correction processing, as well as input gamma correction processing and filter processing, for the scanned image obtained by the scanner unit 206. Further, the scanned image processing unit 302 performs processing such as noise removal, color space conversion, rotation, and compression.

A rendering processing unit 303 develops image data (a PDL code) received from an external apparatus via the network I/F 204, the system bus 301, and the system bus I/F 301 into bitmap data.

A print image processing unit 304 performs image processing as preprocessing for printing using the image data in the printer unit 205. Specifically, the print image processing unit 304 performs image processing such as color space conversion processing for converting RGB (red, green, blue) into CMYK (cyan, magenta, yellow, black), halftone processing based on dithering or error diffusion, and gamma correction processing. The image data obtained through the image processing is output to the printer unit 205. Further, the print image processing unit 304 may output the image data to the printer unit 205 in synchronization with activation of the printer unit 205 and paper feeding. Therefore, the print image processing unit 304 may temporarily write the image data into the DRAM 202 that serves as a buffer for standing-by until the timing of the outputting comes. The print image processing unit 304 may then read the image data from the DRAM 202 and output the read image data to the printer unit 205 in synchronization with the timing of the feeding of recording paper.

A color determination unit 305 determines whether the image processed by the scanned image processing unit 302 is a color image or a monochrome image.

A monochrome conversion unit 306 converts the color image processed by the scanned image processing unit 302 into a monochrome image. A method employed for this monochrome conversion is converting a value calculated by computing a component of RGB for each pixel of the color image into a pixel value of the monochrome image.

Figure 7:
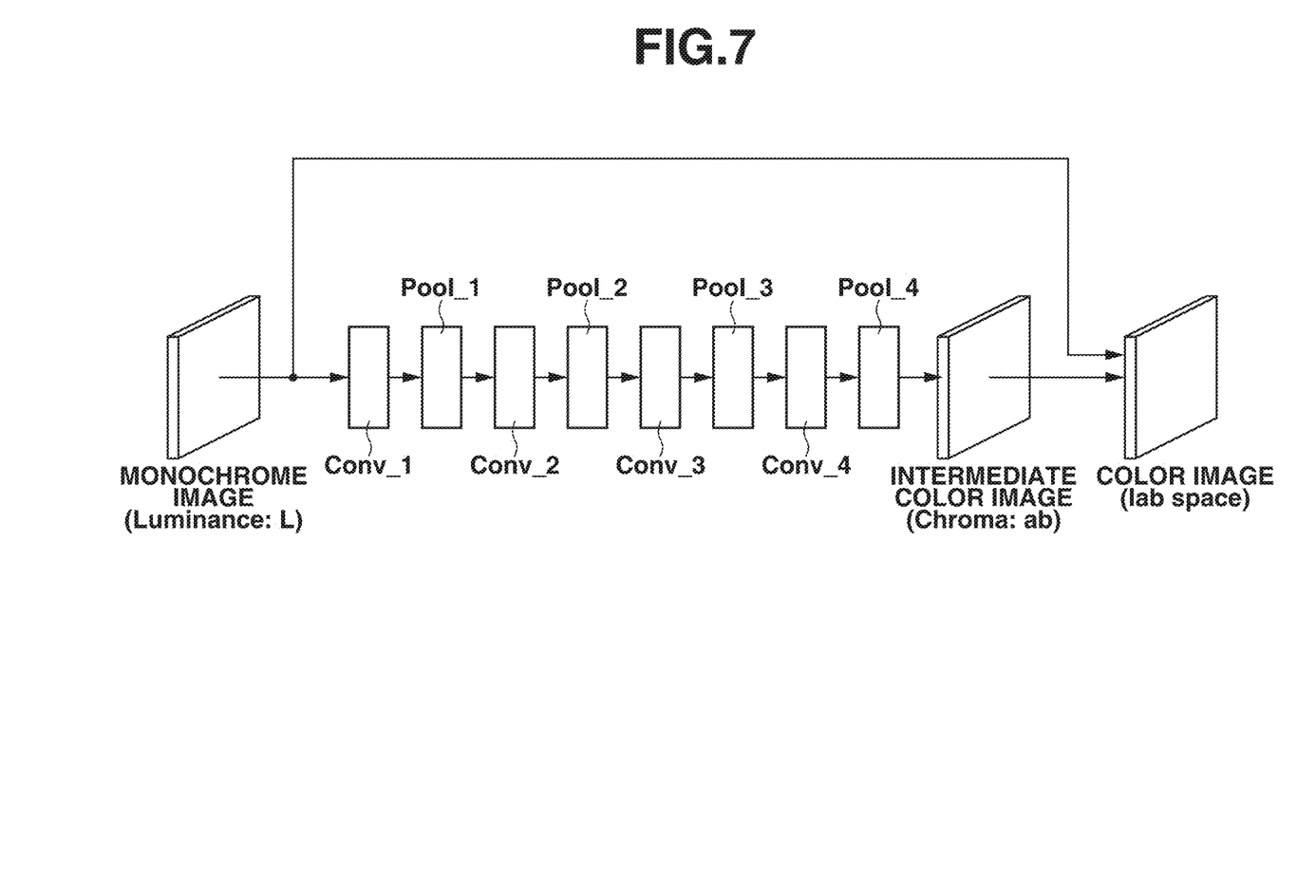
FIG. 7 is a schematic diagram illustrating a processing example performed by a color conversion unit according to the first exemplary embodiment.

A color conversion unit 307 performs colorization processing for converting the monochrome image processed by the scanned image processing unit 302 into a color image. FIG. 7 illustrates an example of a schematic diagram of this processing.

FIG. 7 illustrates convolution layers Cony (Conv_1 to Conv_4) that are each a convolution layer for performing convolution processing. Each of the convolution layers Cony includes a two-dimensional filter function (e.g., a 5×5 filter) (not illustrated), and performs convolution computation for input image data in each of the convolution layers, using the two-dimensional filter function.

Further, pooling layers Pool (Pool_1 to Pool_4) are each a layer for performing pooling processing. Each of the pooling layers Pool includes a two-dimensional pooling function (not illustrated), and takes out a pixel that meets a condition out of pixels within a window of the two-dimensional pooling function, in response to an input to the pooling layer. For example, if a window size is 2×2 for maximum pooling, a pixel having the maximum pixel value is taken out of four pixels within the window.

In a processing model in the color conversion unit 307 according to the present exemplary embodiment, learning is performed in, for example, a configuration in which four sets each including the convolution layer Cony and the pooling layer Pool are connected in series. First, a monochrome image including only luminance information is prepared as input data. This input data is input to the first convolution layer Conv_1 and the convolution processing is performed, and subsequently, the pooling processing is performed on the pooling layer Pool_1. Then, the processing is performed by inputting the processing result of the previous layer to each second to fourth convolution layers Conv_2 to Conv_4 and each of the second to fourth pooling layers Pool_2 to Pool_4. Subsequently, an intermediate color image is generated by mapping the data obtained after the processing of the fourth pooling layer Pool_4 in the ab space of a color space (a Lab space) formed of luminance (L) and chroma (ab). Finally, conversion into a color image is carried out by combining the intermediate color image and a luminance image to perform the colorization processing.

A parameter of the convolution of each of the convolution layers Cony is decided (updated) by learning, and will be described in detail below. The learning is performed by the CPU 201 or a component such as a graphics processing unit (GPU) (not illustrated). The configuration illustrated in FIG. 7 is an example, and the present exemplary embodiment is not limited to this example.

The signal bus 309 of the image processing unit 211 interconnects each module to perform communication.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

<Color Conversion Copy Operation>

Figure 4:
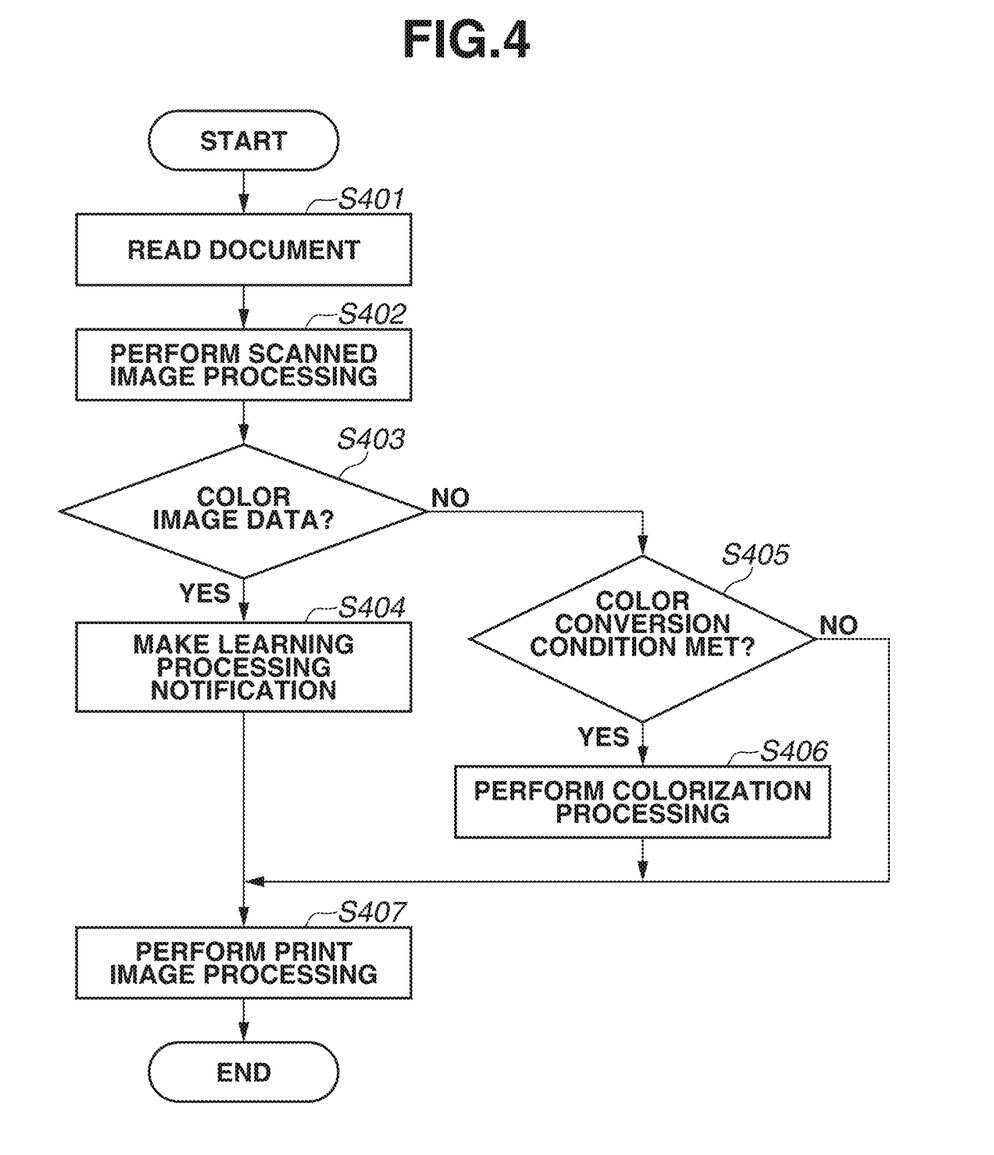
FIG. 4 illustrates a flowchart of copy processing in the MFP according to the first exemplary embodiment.

Here, basic copy operation will be described with reference to FIG. 4. In the basic copy operation, color conversion of a scanned image is performed and the image obtained after the color conversion is printed. The CPU 201 executes the following operation by issuing an instruction to each of the processing units, based on a program stored in the flash ROM 212, unless otherwise specified.

In step S401, the scanner unit 206 reads a document. Image data acquired by reading the document is stored in the DRAM 202.

Next, in step S402, the scanned image processing unit 302 of the image processing unit 211 performs scanned image processing on the image data read in step S401 based on a setting value stored beforehand in the flash ROM 212. Next, in step S403, the color determination unit 305 determines whether the image data subjected to the scanned image processing in step S402 is color image data, i.e., whether the image data is color image data or monochrome image data. If the color determination unit 305 determines that the image data is monochrome image data (NO in step S403), the operation proceeds to step S405. If the color determination unit 305 determines that the image data is color image data (YES in step S403), the operation proceeds to step S404.

In step S404, the CPU 201 provides a learning processing notification. When the learning processing notification is provided, a learning processing flow to be described below is performed in parallel.

In step S405, the CPU 201 determines whether a color conversion condition is met. The color conversion condition is described in detail. Whether the color conversion condition is met is equivalent to whether setting intended for color conversion processing is made by a user.

Figure 8A:
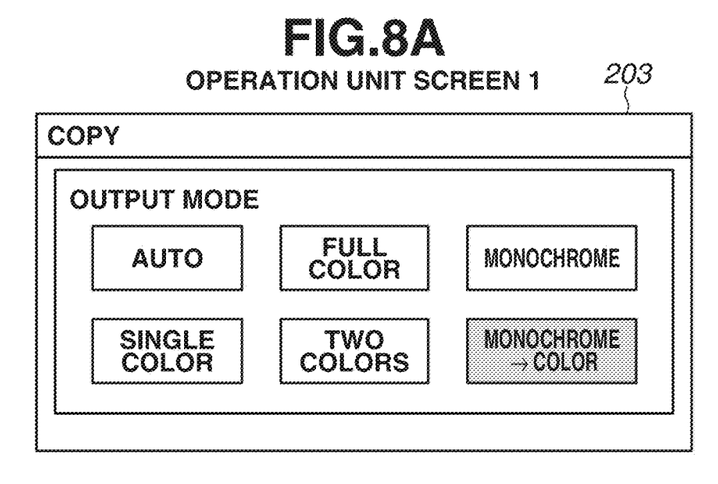
FIGS. 8A to 8D each illustrate a screen example of an operation unit of the MFP according to the first exemplary embodiment.
Figure 8B:
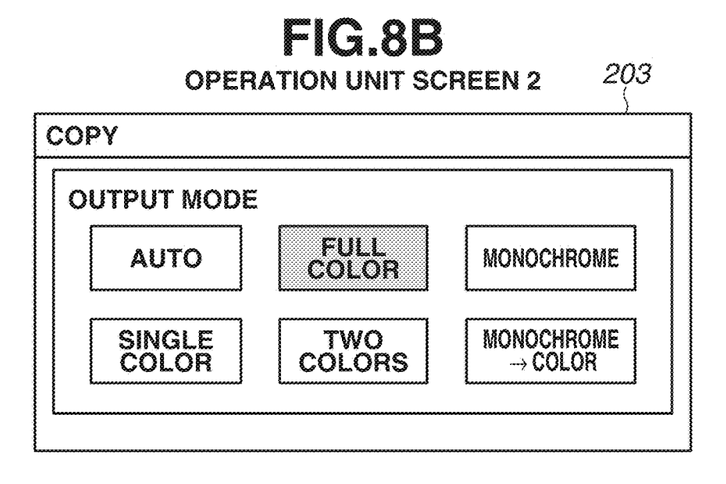

FIGS. 8A to 8D each illustrate a screen example of the operation unit 203. FIGS. 8A and 8B each illustrate an example of a setting screen when an instruction for execution of copying is issued to the image data that is a processing target.

When "FULL COLOR" is selected in this setting screen, image data obtained by scanning a document is printed on a sheet to output a full color print. Further, when "MONOCHROM→COLOR" is selected in the setting screen, a color print is output by performing the printing on a sheet using monochrome image data obtained by scanning a document.

If the CPU 201 determines that the above designation is performed via the setting screen, the CPU 201 determines that the color conversion condition is met. In this step, the image data that is the processing target has been already determined as the monochrome image data obtained by scanning the document. Therefore, the scanned document has been already recognized as monochrome. Further, because color is designated as an output mode in outputting this document, the CPU 201 determines that the color conversion processing is necessary.

Figure 8C:
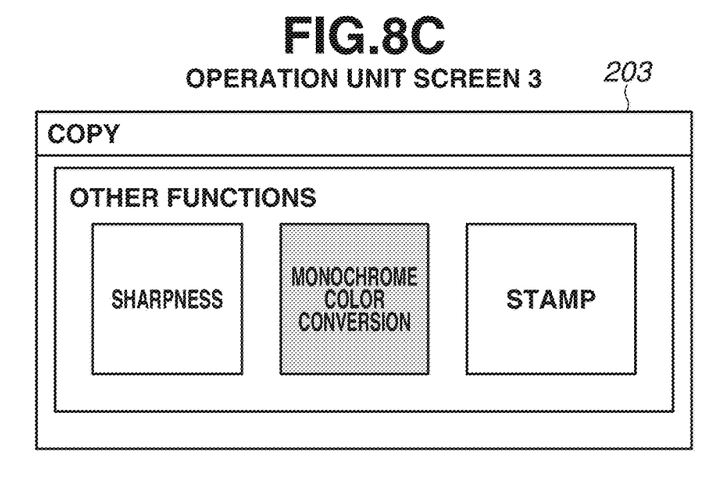

FIG. 8C illustrates an example of a function setting screen in execution of copying, and a function button "MONOCHROME COLOR CONVERSION" is displayed in this screen. The user can designate a monochrome color conversion function by pressing this button. In other words, the user can make a setting to output the monochrome image data as a color print.

Figure 8D:
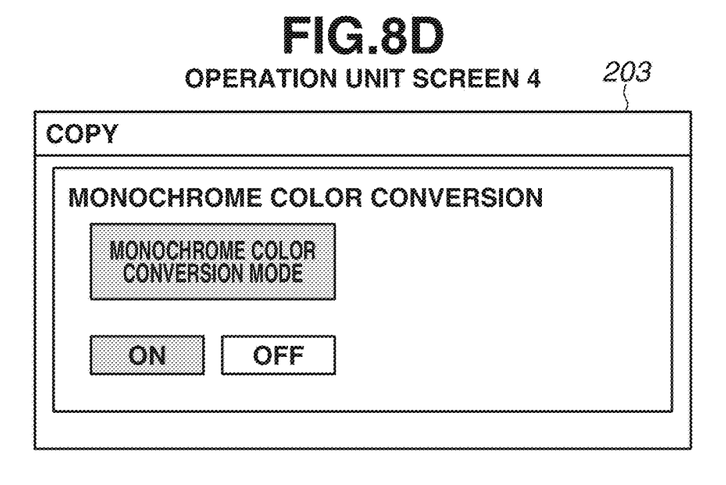

The pressing causes a screen transition and another screen is displayed. FIG. 8D illustrates an example of the displayed screen. In FIG. 8D, a monochrome color conversion mode is already ON. In a case where such setting has been made, the color conversion processing is performed. In other words, the CPU 201 determines that the color conversion condition is met.

The color conversion processing is performed based on the setting designated by the user and the result of the monochrome color determination for the document, in the processing according to the above-described flow. If the color conversion condition is met (YES in step S405), the operation proceeds to step S406. If the color conversion condition is not met (NO in step S405), the operation proceeds to step S407.

In step S406, the color conversion unit 307 performs the colorization processing for the image data subjected to the scanned image processing in step S402. The image data subjected to the colorization processing becomes color image data. This color image data is stored in the DRAM 202.

In step S407, the print image processing unit 304 of the image processing unit 211 performs print image processing on the image data stored in the DRAM 202, based on the setting value stored beforehand in the flash ROM 212. The printer unit 205 then outputs a print by performing the printing on a sheet using the image data subjected to the image processing.

<Learning Operation>

Figure 5:
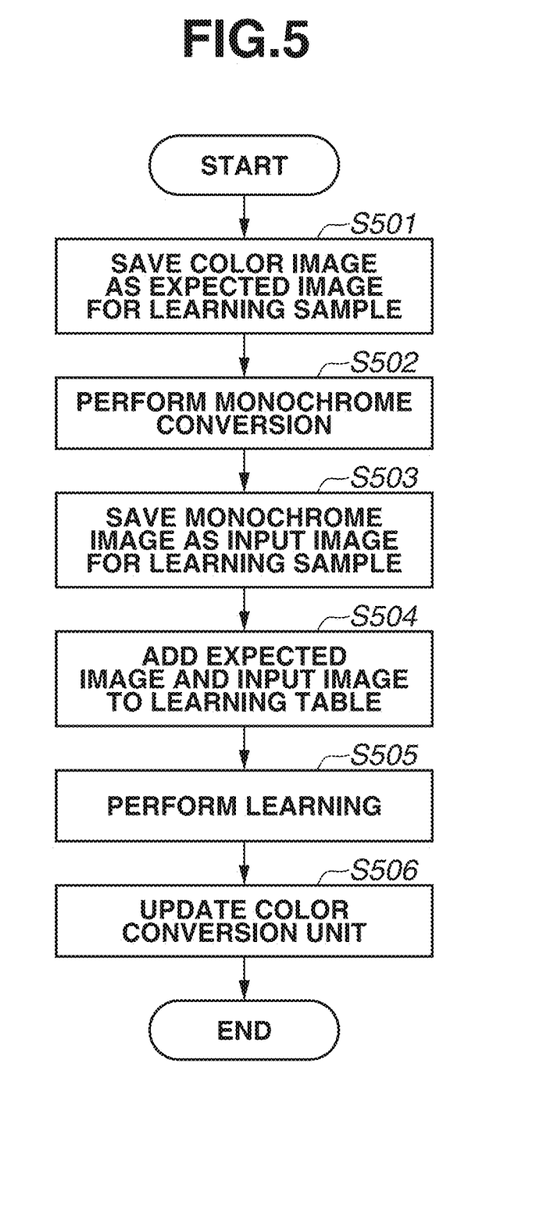
FIG. 5 illustrates a flowchart of learning processing in the MFP according to the first exemplary embodiment.

Next, a flow to be performed in a case where the learning processing notification is provided in step S404 will be described with reference to FIG. 5. The flow is performed to decide (update) data (a parameter) for color conversion to be used when the color conversion unit 307 performs color conversion on the monochrome image.

The CPU 201 executes a following operation by providing an instruction to each of the processing units based on a program stored in the flash ROM 212, unless otherwise specified.

In step S501, the CPU 201 saves the color image data processed by the scanned image processing unit 302 and spooled in the DRAM 202, in the HDD 208 as an expected image for a learning sample. Here, a compression processor (not illustrated) compresses the color image data to be in a format such as Joint Photographic Experts Group (JPEG) to reduce the file size.

In step S502, the monochrome conversion unit 306 performs monochrome conversion for converting the input color image data into monochrome image data, and the monochrome image data is spooled in the DRAM 202.

Next, in step S503, the CPU 201 saves the monochrome image data subjected to the monochrome conversion in step S502 and spooled in the DRAM 202 in the HDD 208, as an input image for the learning sample. A compression processor (not illustrated) compresses the monochrome image data to be in a format such as JPEG to reduce the file size.

Next, in step S504, the CPU 201 adds each image file stored in step S501 and step S503 (i.e., the expected image that is the input color image data, and the input image that is the monochrome image data) to a learning table. The learning table is a table including a path for each image and is stored in the HDD 208.

Figure 6:
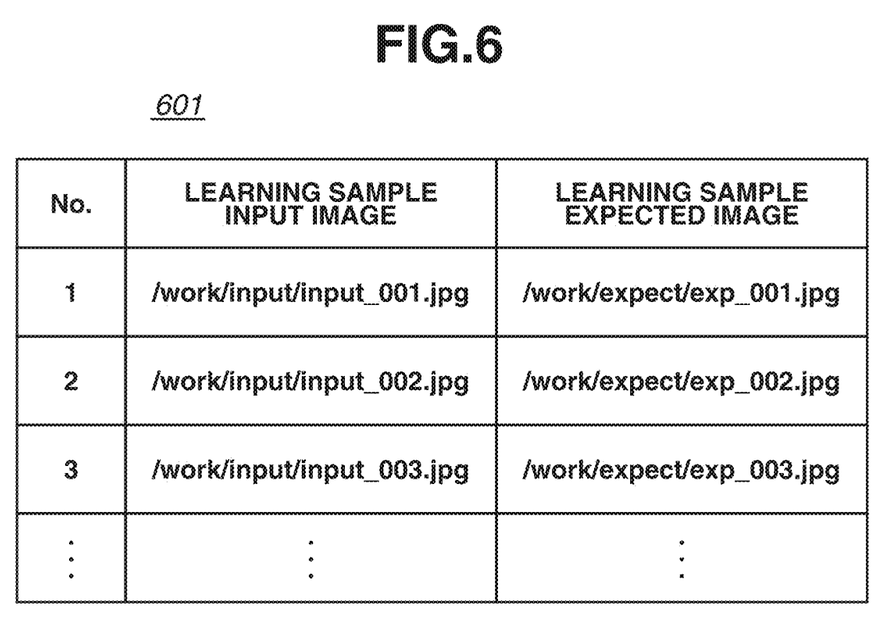
FIG. 6 illustrates an example of a learning table according to the first exemplary embodiment.

FIG. 6 illustrates an example of the table. A learning table 601 stores a pair of an input image (a monochrome image) and an expected image (a color image) as a learning sample.

Next, in step S505, the CPU 201 performs learning, using the images included in the learning table generated in step S504. As described above, the color conversion unit 307 is a processor configured of the multiple layers Conv and Pool, as illustrated in FIG. 7. The parameter in each of the layers Conv and Pool loaded to the processor is updated by the learning. The learning uses a pair of an input image and an expected image in the learning table as a learning sample, and uses learning data as a collection of the learning samples.

The degree of difference between an output image obtained from the processing model to which the input image of the learning sample is input, and the expected image paired with the input image is evaluated using an error function. In the present embodiment, for example, a density difference for each pixel between the output image and the expected image is evaluated using an error function such as cross entropy. Based on an evaluation value thus obtained, the parameter is updated using backpropagation. Specifically, for example, using an optimization function such as stochastic gradient descent, the parameter is updated such that a pixel value of an output result approaches the corresponding pixel value of the expected image of the learning sample in the learning table 601. This processing is applied to each of the layers in order from the layer Pool_4 on the output side to the input side, so that the parameter of each layer is updated. In other words, the parameter is updated by applying feedback to the parameter of each of the multiple layers Conv and Pool. In the example in FIG. 7, the parameter of each of the layers Conv_1, Pool_1, Conv_2, Pool_2, Conv_3, Pool_3, Conv_4, and Pool_4 is updated by the learning. The flow of the processing described above is only an example, and other functions and error criteria may also be used. A parameter decided by the learning of data supplied at a development stage of the image forming apparatus is incorporated as the parameter in the initial state. The parameter is updated as appropriate, in a user environment.

Next, in step S506, the CPU 201 updates the color conversion unit 307. This processing is realized by setting the parameter of each of the layers Conv and Pool updated in step S505, to the processor of the color conversion unit 307. It goes without saying that, in a case where the image processing unit 211 of the MFP 101 is in operation, the CPU 201 updates the color conversion unit 307 after standing by until the operation is completed.

As described above, in the image processing apparatus according to the present exemplary embodiment, the learning sample can be automatically generated in the user environment. When the learning sample is generated, the color conversion parameter of the color conversion unit is automatically decided using the sample. In other words, the parameter is updated to an optimum value. Therefore, it is possible to construct a color conversion processing unit in line with a document pattern or a use-color pattern (a color arrangement) frequently used by the user.

A second exemplary embodiment will be described below. In the first exemplary embodiment, each time a learning sample is added to the learning table, the operation for relearning (deciding (updating) the color conversion parameter to be used by the color conversion unit) is performed. In the above-described method, because the relearning is performed whenever necessary using the acquired learning sample, feedback can be immediately applied to the parameter of the color conversion unit 307. However, the processing for learning involves a large usage amount of resources such as the CPU or the GPU. Meanwhile, there is also a possibility that relearning when one learning sample is added may have a limited influence on the parameter of the color conversion unit 307. For the above-described reasons, in the present exemplary embodiment, there will be described a method for performing such control that the relearning is executed at the timing of obtaining a plurality of learning samples in order to perform effective learning. Processing similar to that already described in the first exemplary embodiment will not be described. A learning processing flow after receipt of a learning processing notification in step S404 is different from the first exemplary embodiment.

Figure 9:
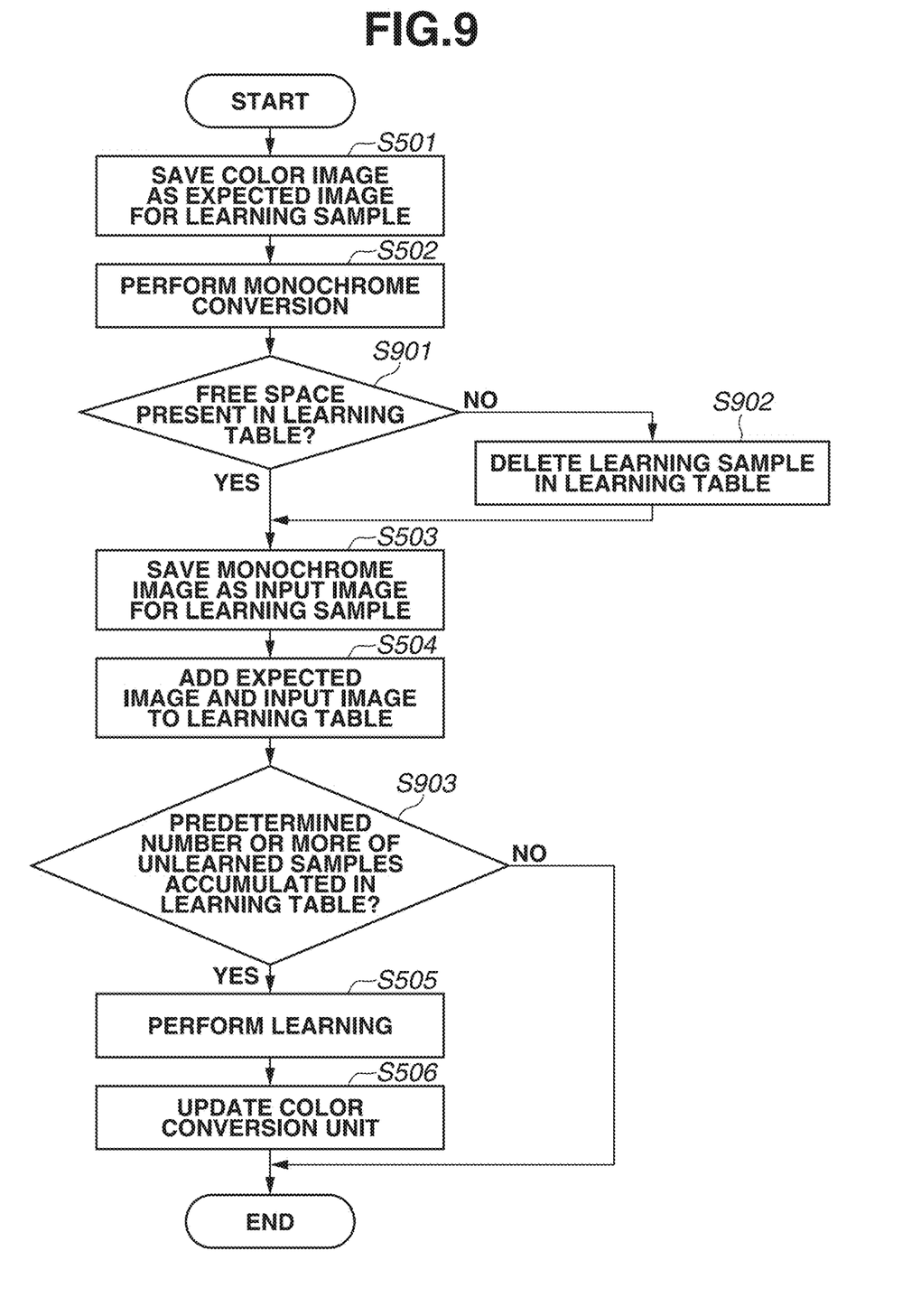
FIG. 9 illustrates a flowchart of learning processing in an MFP according to a second exemplary embodiment.

FIG. 9 illustrates the learning processing flow after receipt of a learning processing notification. A CPU 201 executes a following operation, based on a program stored in a flash ROM 212, unless otherwise specified. Step S501 and step S502 are similar to step S501 and step S502 in the first exemplary embodiment and therefore will not be described.

Figure 10A:
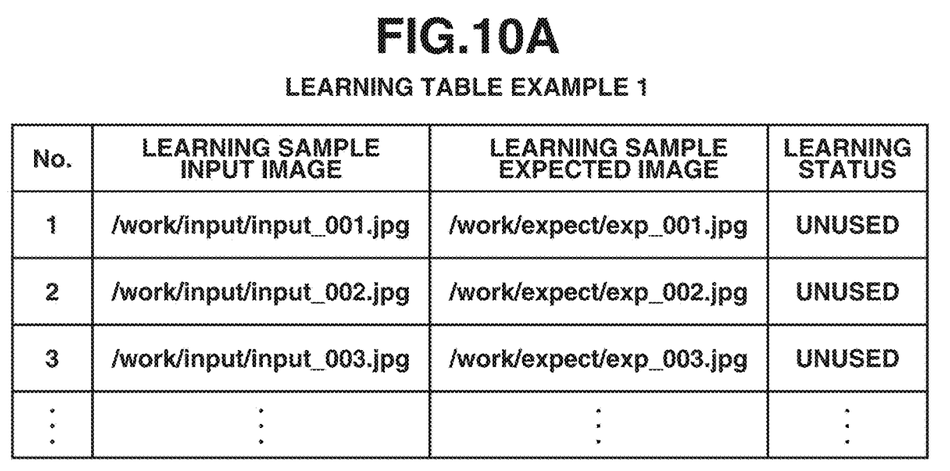
FIGS. 10A and 10B each illustrate an example of a learning table of the MFP according to the second exemplary embodiment.
Figure 10B:
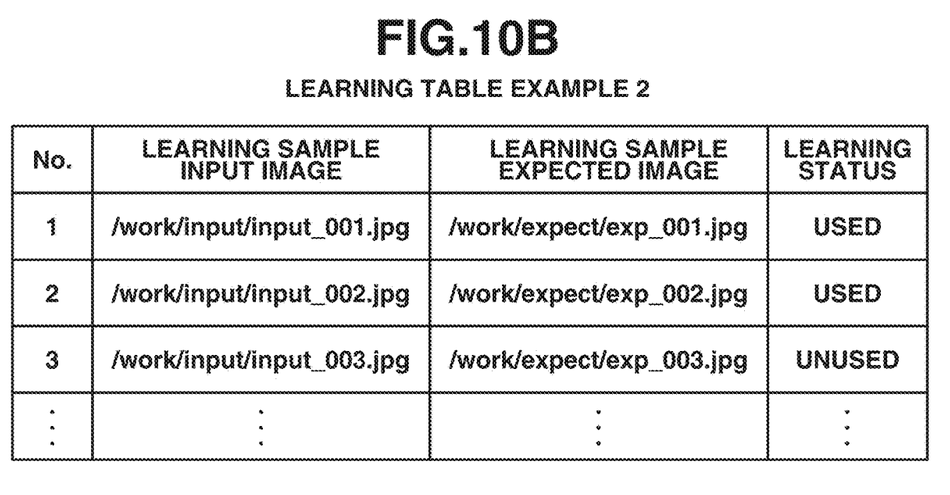

In step S901, the CPU 201 determines whether there is a free space in a storage area (a HDD 208) for storing a learning table. FIGS. 10A and 10B each illustrate a learning table in the present exemplary embodiment. In the learning table illustrated in each of FIGS. 10A and 10B, information indicating a learning status is added and managed. In a case where a learning sample managed in the learning table is used for decision (relearning) of a color conversion parameter, the learning status of this learning sample is managed as "USED". On the other hand, in a case where a learning sample has yet to be used for the decision (relearning) of the color conversion parameter, the learning status of this learning sample is managed as "UNUSED". In other words, it is possible to distinguish whether or not each learning sample is used for the decision (relearning) of the color conversion parameter in the learning table.

The HDD 208 included in a MFP 101 is a limited storage unit, and the number of learning samples to be saved is also limited. Therefore, a situation occurs where there is no free space in the learning table. In this step (step S901), the CPU 201 determines whether there is a free space in the storage area (the HDD 208) for storing learning samples, by referring to the learning table illustrated in each of FIGS. 10A and 10B. If the CPU 201 determines that there is a free space (YES in step S901), the operation proceeds to step S503. If the CPU 201 determines that there is no free space (NO in step S901), the operation proceeds to step S902.

In step S902, the CPU 201 deletes a learning sample in the learning table. The learning sample to be deleted is a sample corresponding to a learning status managed as "USED". In particular, the oldest one among the learning samples corresponding to a learning status managed as "USED" is deleted from the storage area. When the learning sample is deleted from the storage area, an area where this learning sample has been stored is free, i.e., information about a new learning sample can be stored in this free area. Upon completion of the processing, the operation proceeds to step S503.

Step S503 and step S504 are similar to step S503 and step S504 in the first exemplary embodiment, respectively. However, in a case where a new learning sample is added to the learning table, information indicating the learning status of this learning sample is managed as "UNUSED".

In step S903, the CPU 201 determines whether a predetermined number or more of unlearned samples are accumulated in the learning table. The learning table illustrated in FIGS. 10A and 10B includes the information indicating the learning status. Therefore, the CPU 201 can confirm the number of unlearned samples by referring to this information. If the predetermined number (e.g., 50) or more of unlearned samples are accumulated (YES in step S903), the operation proceeds to step S505. If the predetermined number or more of unlearned samples are not accumulated (NO in step S903), the operation proceeds to END. Step S505 and step S506 are similar to step S505 and step S506 in the first exemplary embodiment, respectively. However, the learning status in the learning table for the learning sample used in the learning processing is updated to "USED".

As described above, in the second exemplary embodiment, the relearning (decision (update) of a color conversion parameter used by a color conversion unit) is carried out at the timing that the predetermined number or more of unlearned samples are accumulated in the learning table. This can decrease the frequency of relearning and thus can reduce the power consumption by the MFP 101. In other words, effective relearning can be implemented.

A third exemplary embodiment will be described below. In the first and second exemplary embodiments, the learning samples can be automatically collected if the user normally uses the MFP 101 (performs the processing that involves the scanning operation, such as copying). However, it is conceivable that a serviceman or a user may want to add a learning sample to the MFP 101 intentionally at desired timing.

For example, in a case where the user desires to use a hue type (such as a color arrangement) of a document for which the user frequently performs color conversion, image data obtained by scanning the document may be intentionally added as a learning sample. This addition enhances the probability of performing the color conversion desired by the user in the subsequent color conversion processing.

In the third exemplary embodiment, operation to be performed in a case where a mode for supplying a learning sample to a MFP 101 is provided, which will be described below. Processing similar to the processing already described in the first and second exemplary embodiments will not be described.

Figure 11:
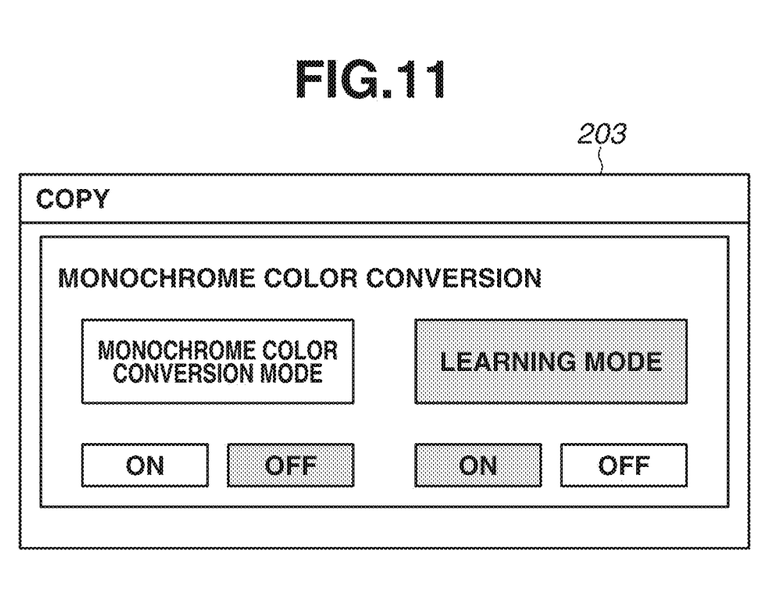
FIG. 11 illustrates a screen example of an operation unit of an MFP according to a third exemplary embodiment.
Figure 12:
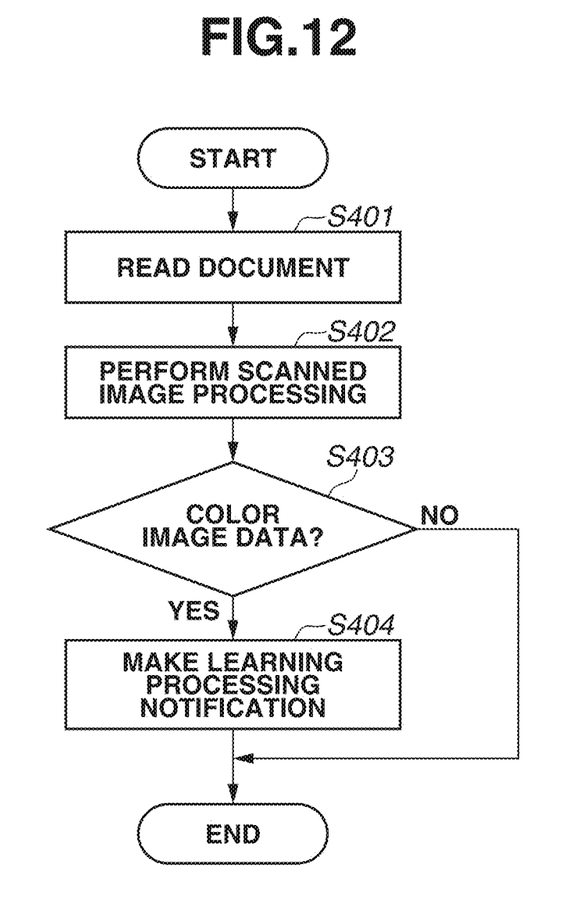
FIG. 12 illustrates a flowchart of a learning mode of the MFP according to the third exemplary embodiment.

In the third exemplary embodiment, a learning mode can be added and set from an operation unit 203. FIG. 11 illustrates an example of a screen of the operation unit 203. In this example, a button for the learning mode can be pressed in a screen for setting a monochrome color conversion function. Processing for the learning mode starts when a start button (not illustrated) is pressed in a state where the learning mode is ON. FIG. 12 illustrates the processing for the learning mode as a flowchart. FIG. 12 illustrates steps excerpted from the steps illustrated in FIG. 4. Steps S401, S402, S403, and S404 are similar to steps S401, S402, S403, and S404 in the first exemplary embodiment, respectively. In the first exemplary embodiment, step S407 for the print image processing is provided as the last step. However, in the learning mode, a user does not intend to carry out copying, but intends to supply a learning sample to the MFP 101, and thus, the print image processing and the print processing are not performed. Therefore, in this processing, it is possible to add a learning sample without performing the print operation. Further, relearning (decision (update) of a color conversion parameter to be used by a color conversion unit) can be performed using the added learning sample.

As described above, in the third exemplary embodiment, a serviceman or a user can add a learning sample at desired timing.

As described above, there is conventionally no method for automatically collecting learning samples for color conversion to perform color conversion of monochrome image data input into an image processing apparatus. The present disclosure provides technological improvements or unconventional solutions in advancements and/or improvements in image processing technology through use of specific manners of use with specific limitations on available data and configurational states.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-035593, filed Feb. 28, 2018, which is hereby incorporated by reference herein in its entirety.

What is claimed is:

1. An image processing apparatus comprising:
a memory that stores a program; and
a processor that causes, by executing the program stored in the memory, the image processing apparatus to:
determine whether image data obtained by reading a document with a reader is color or monochrome;
save color image data determined to be color and monochrome image data generated by monochrome conversion of the color image data, in association with each other as a learning sample;
decide, using the learning sample, a color conversion parameter to be used when new image data obtained by reading a new document with the reader and determined to be monochrome image data is converted into color image data; and
convert the new image data obtained by reading the new document with the reader and determined to be monochrome image data into color image data, using the decided color conversion parameter.

2. The image processing apparatus according to claim 1, wherein the color conversion parameter is decided, using a learning sample not used for decision of a color conversion parameter, among saved learning samples.

3. The image processing apparatus according to claim 1, wherein in a case where an instruction to output in color the new image data read by the reader is issued, the new image data is converted into color image data, using the color conversion parameter.

4. The image processing apparatus according to claim 1, wherein the processor further causes, by executing the program stored in the memory, the image processing apparatus to delete a learning sample used for decision of a color conversion parameter, among saved learning samples,
wherein after deletion of the learning sample, other color image data and monochrome image data obtained by monochrome conversion of the other color image data are saved, in association with each other as a new learning sample.

5. The image processing apparatus according to claim 1, wherein among saved learning samples, a learning sample used for decision of a color conversion parameter and a learning sample not used for decision of a color conversion parameter are distinguishable from each other.

6. The image processing apparatus according to claim 1, wherein a learning sample that is generated using color image data obtained by reading the document with the reader and monochrome image data generated by monochrome conversion of the color image data is saved, based on an instruction for generation of a learning sample issued by a user.

7. An image processing method comprising:
determining whether image data obtained by reading a document with a reader is color or monochrome;
saving color image data determined to be color and monochrome image data generated by monochrome conversion of the color image data, in association with each other as a learning sample;
deciding, using the learning sample, a color conversion parameter to be used when image data read by the reader and determined to be monochrome image data is converted into a color image; and
converting the image data read by the reader and determined to be monochrome image data into color image data, using the decided color conversion parameter.

8. A computer readable storage medium storing a program that causes a computer of a subject apparatus to execute an image processing method, the image processing method comprising:
determining whether image data obtained by reading a document with a reader is color or monochrome;
saving color image data determined to be color and monochrome image data generated by monochrome conversion of the color image data, in association with each other as a learning sample;
deciding, using the learning sample, a color conversion parameter to be used when image data read by the reader and determined to be monochrome image data is converted into a color image; and converting the image data read by the reader and determined to be monochrome image data into color image data, using the decided color conversion parameter.

9. An image processing apparatus comprising:
a reader;
a memory that stores a program; and
a processor that causes, by executing the program stored in the memory, the image processing system to:
cause the reader to read a document;
determine whether image data obtained by reading the document with the reader is color or monochrome;
determine, as a learning sample, color image data determined to be color and monochrome image data generated by monochrome conversion of the color image data;
cause the reader to read a new document; and
obtain color image data to which new image data obtained by reading the new document with the reader and determined to be monochrome image data is converted using the learning sample.

10. The image processing apparatus according to claim 9, wherein in a case where an instruction to output in color the new image data read by the reader is issued, the color image data is obtained.

11. The image processing apparatus according to claim 9, wherein the processor further causes, by executing the program stored in the memory, the image processing apparatus to:
delete a learning sample used for decision of a color conversion parameter, among determined learning samples,
wherein after deletion of the learning sample, other color image data and monochrome image data obtained by monochrome conversion of the other color image data are determined, as a new learning sample.

12. The image processing apparatus according to claim 9, wherein among determined learning samples, a learning sample used for decision of a color conversion parameter and a learning sample not used for decision of a color conversion parameter are distinguishable from each other.

13. The image processing apparatus according to claim 9, wherein a learning sample that is generated using color image data obtained by reading the document with the reader and monochrome image data generated by monochrome conversion of the color image data is determined, based on an instruction for generation of a learning sample issued by a user.

* * * * *